US012034253B2

(12) United States Patent
Matsuoka

(10) Patent No.: US 12,034,253 B2
(45) Date of Patent: Jul. 9, 2024

(54) CONNECTOR HAVING HOUSING COVERING A PLURALITY OF TERMINALS

(71) Applicant: SUMITOMO WIRING SYSTEMS, LTD., Mie (JP)

(72) Inventor: Hiroyuki Matsuoka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 224 days.

(21) Appl. No.: 17/703,680

(22) Filed: Mar. 24, 2022

(65) Prior Publication Data

US 2022/0311191 A1 Sep. 29, 2022

(30) Foreign Application Priority Data

Mar. 26, 2021 (JP) ................................ 2021-053879

(51) Int. Cl.
*H01R 13/658* (2011.01)
*H01R 13/10* (2006.01)
*H01R 13/6581* (2011.01)

(52) U.S. Cl.
CPC ......... *H01R 13/6581* (2013.01); *H01R 13/10* (2013.01); *H01R 2201/26* (2013.01)

(58) Field of Classification Search
CPC . H01R 13/6581; H01R 13/10; H01R 2201/26
USPC .................................................... 439/607.01
See application file for complete search history.

(56) References Cited

U.S. PATENT DOCUMENTS 6,815,610 B2 * 11/2004 Kuboshima ........ H01R 13/6593 439/98
7,264,506 B2 * 9/2007 Mori ...................... H01R 11/03 439/97
8,425,256 B2 * 4/2013 Aoki .................... H01R 13/688 439/620.32
8,641,441 B2 * 2/2014 Aoki .................... H01R 13/415 439/587
8,790,135 B2 * 7/2014 Maegawa .............. H01R 43/24 439/246
9,806,436 B2 * 10/2017 Takahashi ................ H01R 4/70
10,553,979 B2 * 2/2020 Iida ......................... B60L 3/003
2010/0273362 A1 * 10/2010 Matsuoka ................ H01R 9/18 439/737

(Continued)

FOREIGN PATENT DOCUMENTS

JP 2003317876 A * 11/2003
JP 2012-256573 A 12/2012
JP 2021026932 A * 2/2021 ......... B29C 45/0025

*Primary Examiner* — Peter G Leigh
(74) *Attorney, Agent, or Firm* — Venjuris, P.C.

(57) ABSTRACT

A connector 10 includes a plurality of terminals 20 formed by a metal plate and extending in parallel to each other and a housing 40 made of resin for covering the plurality of terminals 20, and is mounted on a case 101 of a device 100. The terminal 20A, 20B, 20C includes a first extending portion 21A, 21B, 21C extending in a first direction Z and a second extending portion 22A, 22B, 22C extending from a part of the first extending portion 21A, 21B, 21C on a side opposite to the case 101 and to be connected to a wire 30. Plate thickness directions of a plurality of the first extending portions 21A, 21B and 21C coincide with each other. A plurality of the second extending portions 22A, 22B and 22C extend in a plane direction intersecting the first direction Z and orthogonal to the plate thickness directions.

8 Claims, 8 Drawing Sheets

(56) References Cited

U.S. PATENT DOCUMENTS

| | | | | |
|---|---|---|---|---|
| 2011/0130049 | A1* | 6/2011 | Kaneshiro .............. | H01R 9/226 |
| | | | | 174/68.2 |
| 2016/0329651 | A1* | 11/2016 | Yamaguchi ............ | H01R 13/44 |
| 2019/0386416 | A1* | 12/2019 | Takagi ................... | H01R 13/04 |

* cited by examiner

CONNECTOR HAVING HOUSING COVERING A PLURALITY OF TERMINALS

CROSS-REFERENCE TO RELATED APPLICATIONS

This application is based on and claims priority from Japanese Patent Application No. 2021-053879, filed on Mar. 26, 2021, with the Japan Patent Office, the disclosure of which is incorporated herein in their entireties by reference.

TECHNICAL FIELD

The present disclosure relates to a connector.

BACKGROUND

Japanese Patent Laid-open Publication No. 2012-256573 discloses a connector connection structure for connecting a connector to a casing of a device. The casing has an opening in which a plurality of first terminal portions are arranged. The connector includes a plurality of second terminal portions and a connector body having the second terminal portions embedded therein. The connector is mounted on the casing with a part of the connector body inserted in the opening of the casing.

One end of each second terminal portion is electrically connected to each first terminal portion. The other end of each second terminal portion is electrically connected to a cable. A silicon portion having connected parts of the second terminal portions and the cables embedded therein is provided inside the connector body. Each cable extends from the silicon portion toward a side opposite to the casing in a mounting direction of the connector on the casing.

SUMMARY

Another component different from the connector may be present on a side opposite to the casing across the connector in the mounting direction. In this case, it is considered to bend the respective cables (hereinafter, referred to as wires) to avoid interference with the other component. However, a bending radius of the wire increases depending on a material or thickness of the wire. Thus, even if the respective wires are bent, a large clearance needs to be set between the connector body and the other component to prevent these wires from interfering with the other component.

The present disclosure aims to provide a connector capable of suppressing the interference of wires with another component.

The present disclosure is directed to a connector to be mounted on a case of a device, the connector including a plurality of terminals formed by a metal plate, the plurality of terminals extending in parallel to each other, and a housing made of resin for covering the plurality of terminals, wherein each terminal includes a first extending portion extending in a mounting direction of the connector on the case and a second extending portion extending from a part of the first extending portion on a side opposite to the case and to be connected to a wire, plate thickness directions of a plurality of the first extending portions coincide with each other, and a plurality of the second extending portions extend in a plane direction intersecting the mounting direction and orthogonal to the plate thickness directions.

According to the present disclosure, it is possible to suppress the interference of wires with another component.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
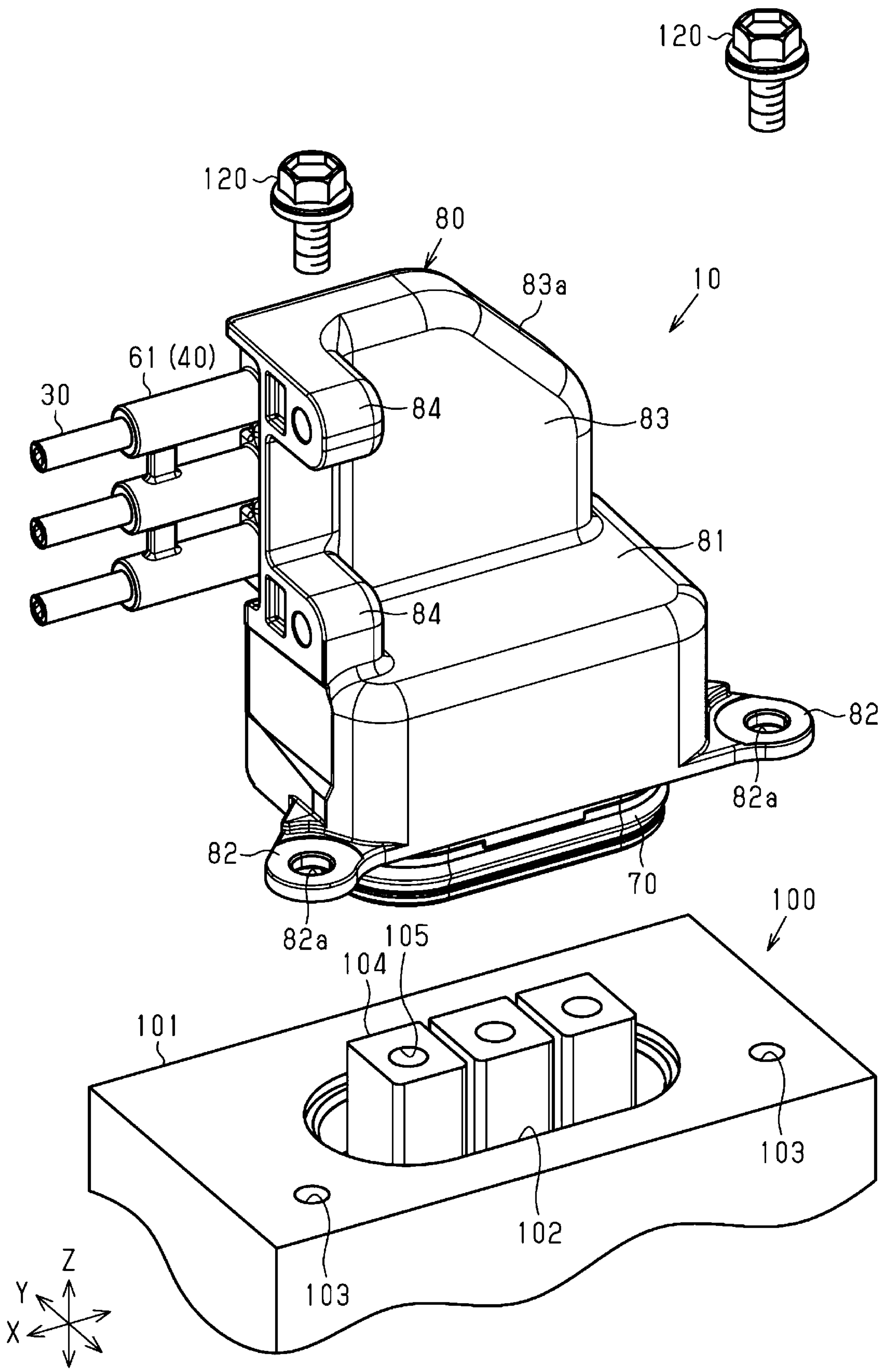
FIG. 1 is an exploded perspective view showing a connector and a case of one embodiment in a separated state.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

[1] The connector of the present disclosure is a connector to be mounted on a case of a device and includes a plurality of terminals formed by a metal plate, the plurality of terminals extending in parallel to each other, and a housing made of resin for covering the plurality of terminals, wherein each terminal includes a first extending portion extending in a mounting direction of the connector on the case and a second extending portion extending from a part of the first extending portion on a side opposite to the case and to be connected to a wire, plate thickness directions of a plurality of the first extending portions coincide with each other, and a plurality of the second extending portions extend in a plane direction intersecting the mounting direction and orthogonal to the plate thickness directions.

According to this configuration, the second extending portion of each terminal extends in the plane direction intersecting the mounting direction and orthogonal to the plate thickness direction of the first extending portion. Thus, an extending direction of the wire connected to the second extending portion can be made different from the mounting direction without being the wire. Therefore, the interference of the wires with another component can be suppressed.

[2] Preferably, the plurality of terminals are embedded in the housing while being separated from each other.

According to this configuration, since the housing made of insulating resin is present between the terminals, the terminals can be electrically insulated from each other.

[3] Preferably, the plurality of first extending portions are parallel to each other in the plane direction, and the plurality of second extending portions are parallel to each other in the plane direction.

According to this configuration, the respective first extending portions and the respective second extending portions are located on the same plane. Thus, it is possible to suppress an increase in the size of the housing and, consequently, an increase in the size of the connector in a direction orthogonal to the plane direction, i.e. the plate thickness directions of the first extending portions.

[4] Preferably, the second extending portion farthest from the case in the mounting direction, out of the plurality of second extending portions, includes an inclined portion continuous with the first extending portion and extending obliquely with respect to the mounting direction, and the housing has an outer surface extending along the inclined portion and covering the inclined portion.

According to this configuration, the plurality of terminals can be made compact as compared to the case where the second extending portion farthest from the case does not include the inclined portion. Further, since the housing has the outer surface extending along the inclined portion and the covering the inclined portion, the housing can also be made compact. Therefore, an increase in the size of the connector can be suppressed.

[5] Preferably, each second extending portion includes a wire connecting portion to be connected to the wire and a straight portion continuous with the wire connecting portion, and a plurality of the wire connecting portions are parallel to each other in a direction orthogonal to extending directions of the straight portions.

According to this configuration, since the plurality of wire connecting portions are parallel to each other in the direction orthogonal to the extending directions of the straight portions, lengths of the wires connected to the respective wire connecting portions can be easily made equal. Therefore, an increase in the types of the wires used in the connector can be suppressed.

[6] Preferably, the connector includes a plurality of the wires to be respectively connected to the terminals, each second extending portion includes a wire connecting portion to be connected to the wire and a straight portion continuous with the wire connecting portion, each wire connecting portion is covered by the housing, and each wire extends in the extending direction of the straight portion.

According to this configuration, each wire connecting portion is covered by the housing. Thus, each wire connecting portion can be protected by the housing. Further, each wire extends in the extending direction of the straight portion from the housing. Thus, a load is less likely to be applied to the wire connecting portion. Therefore, the durability of the connector can be enhanced.

[7] Preferably, the connector includes a shield shell made of metal for covering an outer periphery of a part of the housing for covering the plurality of terminals.

According to this configuration, each terminal covered by the housing can be electromagnetically shielded.

[8] Preferably, each terminal includes a third extending portion extending in the plate thickness direction from a part of the first extending portion on the case side, each third extending portion includes a bolt hole penetrating therethrough in the mounting direction, the housing includes a tubular portion penetrating therethrough in the mounting direction and configured to accommodate each third extending portion, and the tubular portion includes an opening where each bolt hole is exposed.

According to this configuration, a bolt can be easily inserted through the opening into the bolt hole of the third extending portion accommodated in the tubular portion. In this way, the third extending portion of the terminal and a connecting member provided inside the case can be easily fastened by the bolt. Therefore, a connecting operation of the connector and the device can be easily performed.

Details of Embodiment of Present Disclosure

A specific example of a connector of the present disclosure is described below with reference to the drawings. In each figure, some of components may be shown in an exaggerated or simplified manner for the convenience of description. Further, a dimension ratio of each part may be different in each figure. Note that the present disclosure is not limited to these illustrations and is intended to be represented by claims and include all changes in the scope of claims and in the meaning and scope of equivalents. “Orthogonal” in this specification means not only strictly orthogonal, but also substantially orthogonal within a range in which functions and effects in the embodiment are achieved.

As shown in FIG. 1, a connector 10 is, for example, mounted on a case 101 of a device for vehicle such as a motor or inverter.

An opening 102, into which a part of the connector 10 is inserted, and two fixing holes 103 for fixing the connector 10 are provided in an outer surface of the case 101. Three connecting members 104 made of metal and projecting from the opening 102 are provided in parallel inside the case 101. Each connecting member 104 projects further outward than the outer surface of the case 101. Each connecting member 104 is provided with a screw hole 105.

(Configuration of Connector 10)

Figure 2:
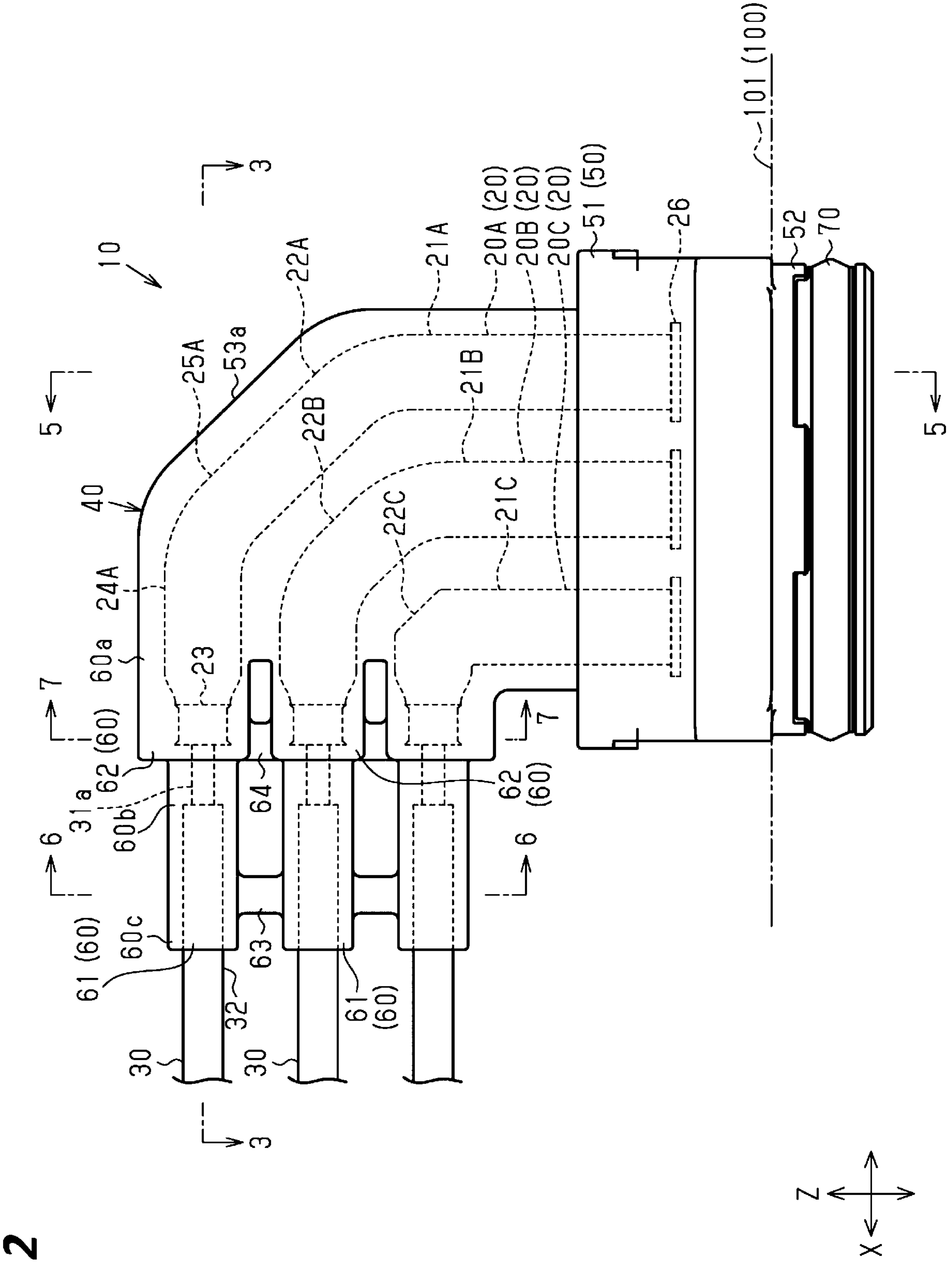
FIG. 2 is a front view of a housing.

As shown in FIGS. 1 and 2, the connector 10 includes a plurality of terminals 20, a plurality of wires 30, a housing 40 made of resin, and a shield shell 80 made of metal. The connector 10 includes, for example, three terminals 20A, 20B and 20C and three wires 30.

The respective terminals 20, the respective wires 30 and the housing 40 are integrated by insert molding. The respective terminals 20 and the respective wires 30 are embedded in the housing 40 while being electrically connected to each other. The plurality of terminals 20 are embedded in the housing 40 while being separated from each other. The plurality of wires 30 extend in the same direction from the housing 40. The shield shell 80 electromagnetically shields the respective terminals 20 and the respective wires 30 by covering a part of the outer periphery of the housing 40.

A mounting direction of the connector 10 on the case 101 is referred to as a first direction Z, an extending direction of the respective wires 30 is referred to as a second direction X, and a direction orthogonal to both the first direction Z and the second direction X is referred to as a third direction Y below. In this embodiment, the first, second and third directions Z, X and Y are orthogonal to each other.

(Configuration of Wires 30)

Figure 3:
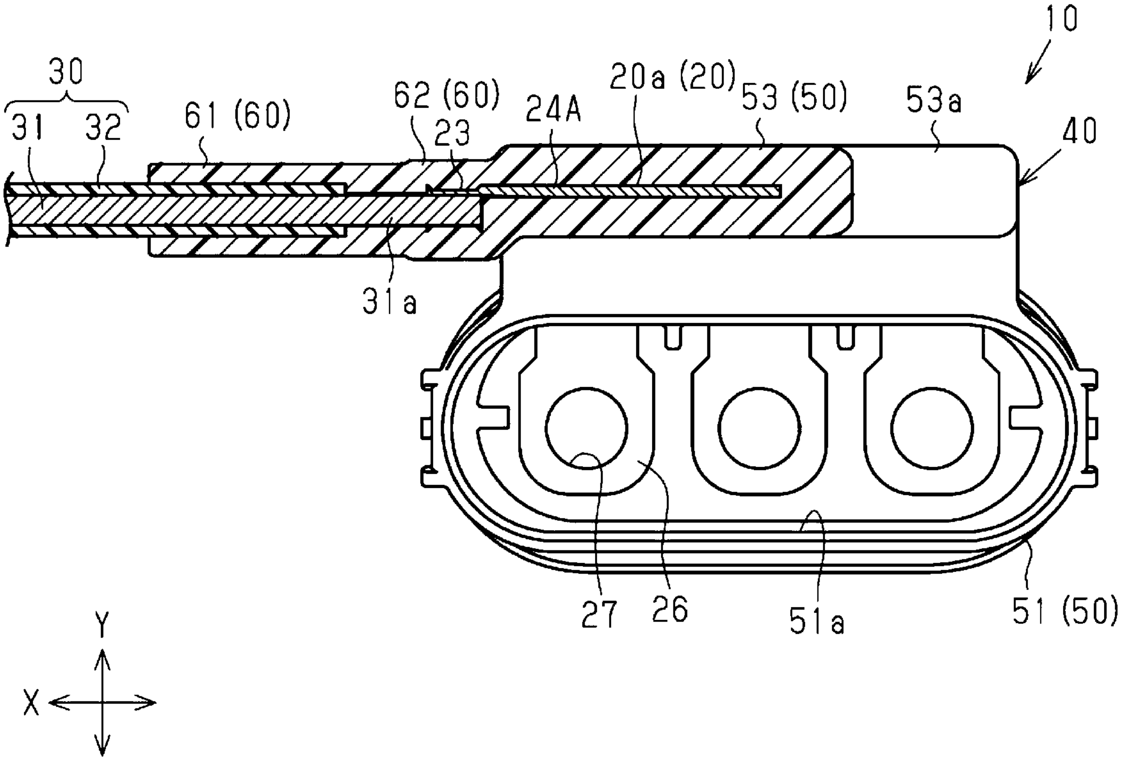
FIG. 3 is a section along 3-3 of FIG. 2.

As shown in FIG. 3, the wire 30 includes a core 31 and an insulation coating 32 covering the outer periphery of the core 31. The wire 30 includes an exposed portion 31*a* in which the core 31 is exposed from the insulation coating 32 in an end part of the wire 30. The exposed portion 31*a* is electrically connected to the terminal 20.

A water cut-off treatment is applied to the exposed portion 31*a* to suppress the contact of the wire 31 with water. In this embodiment, the water cut-off treatment is the application of an adhesive to the exposed portion 31*a*. By applying the adhesive, the contact of the core 31 and water is suppressed even if water intrudes into the housing 40. Further, if the core 31 is a stranded wire formed by twisting a plurality of metal strands, the intrusion of water between the metal strands due to a capillary phenomenon is suppressed. In this embodiment, the exposed portion 31*a* functions as an applied portion formed by applying the adhesive to the core 31 exposed from the insulation coating 32. Note that it is not essential to provide the wire 30 with the applied portion.

A copper-based or aluminum-based metal material can be, for example, used as a material of the core 31. A resin material mainly containing a polyolefin-based resin such as cross-linked polyethylene or cross-linked polypropylene can be used as a material of the insulation coating 32.

As shown in FIG. 2, the plurality of wires 30 are arranged at intervals from each other and in parallel in the first direction Z.

(Configuration of Terminals 20)

The terminals 20 are formed by a metal plate. An iron-based, copper-based or aluminum based metal material can be, for example, used as a material of the terminals 20.

The terminals 20A, 20B and 20C are provided at positions away from the case 101 in this order in the first direction Z.

The configurations of the terminals 20B and 20C are the same as or correspond to that of the terminal 20A. The configuration of the terminal 20A farthest from the case 101 in the first direction Z is described in detail below. The same components of the terminals 20B, 20C as those of the terminal 20A are denoted by the same reference signs and the components thereof corresponding to those of the terminal 20A are denoted by reference signs obtained by changing an end "A" of reference signs "2*A" denoting the components of the terminal 20A by "B" and "C", whereby repeated description may be omitted.

Figure 4:
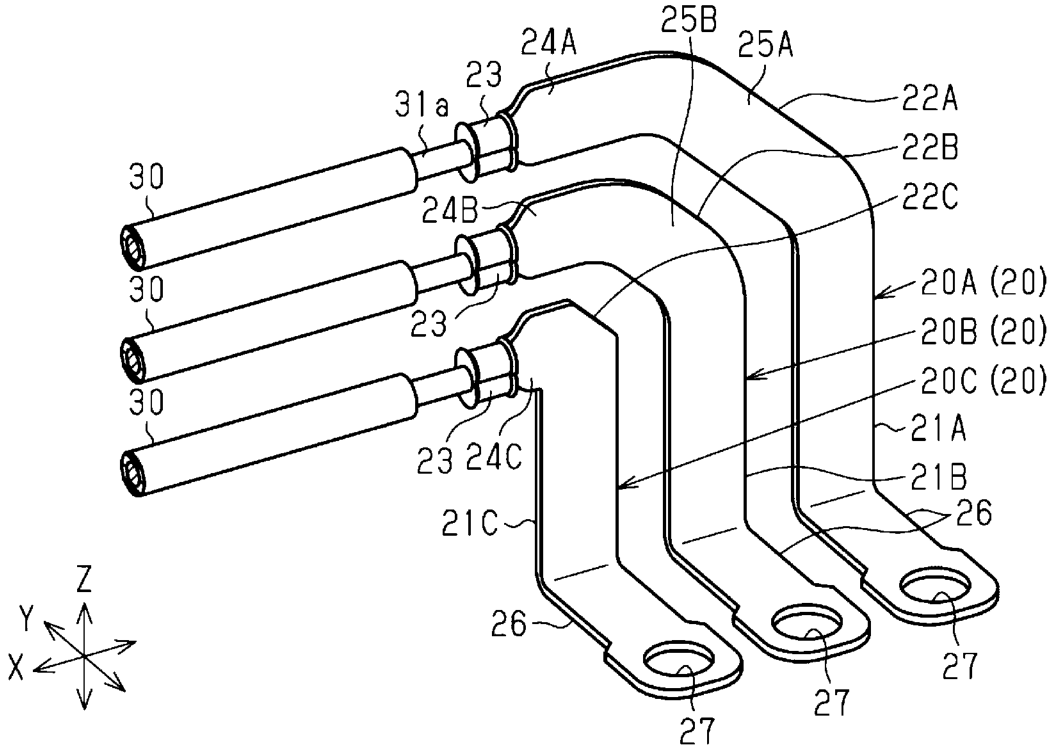
FIG. 4 is a perspective view showing a plurality of terminals and a plurality of wires.

As shown in FIG. 4, the terminal 20A includes a first extending portion 21A, a second extending portion 21A and a third extending portion 26.

(Configurations of First Extending Portions 21A, 21B and 21C)

The first extending portion 21A extends in the first direction Z. A plate thickness direction of the first extending portion 21A coincides with the third direction Y.

Plate thickness directions of the plurality of first extending portions 21A, 21B and 21C coincide with each other. The plurality of first extending portions 21A, 21B and 21C are parallel to each other in the second direction X. The first extending portions 21A, 21B and 21C are formed to be longer in this order.

(Configurations of Second Extending Portions 22A, 22B and 22C)

The second extending portion 22A extends from a part of the first extending portion 21A on a side opposite to the case 101. The wire 30 is connected to the second extending portion 22A. A plate thickness direction of the second extending portion 22A coincides with the third direction Y.

The plurality of second extending portions 22A, 22B and 22C extend in a plane direction intersecting the first direction Z and orthogonal to the plate thickness direction of the first extending portion 21A. The second extending portions 22A, 22B and 22C are formed to be longer in this order. The plane direction orthogonal to the plate thickness direction of the first extending portion 21A may be merely referred to as a "plane direction" below.

The second extending portion 22A includes a wire connecting portion 23 to be connected to the exposed portion 31*a* of the wire 30 and a straight portion 24A continuous with the wire connecting portion 23. The wire connecting portion 23 is crimped to the exposed portion 31*a*. The straight portion 24A extends straight in the second direction X. Accordingly, the straight portion 24A extends orthogonally to the first extending portion 21A. Each wire 30 extends in an extending direction of each straight portion 24A, 24B, 24C, i.e. in the second direction X.

The plurality of wire connecting portions 23 are parallel to each other in a direction orthogonal to the extending direction of the straight portion 24A, i.e. in the first direction Z. Similarly, the plurality of straight portions 24A, 24B and 24C are parallel to each other in the first direction Z.

The second extending portion 22A includes an inclined portion 25A coupling an end part of the first extending portion 21A and an end part of the straight portion 24A. The inclined portion 25A is continuous with the first extending portion 21A and extends obliquely with respect to the first direction Z in the plane direction. The inclined portion 25A is inclined to approach the straight portion 24A in the second direction X with distance from the first extending portion 21A in the first direction Z. The inclined portion 25A is formed to be longer than an inclined portion 25B.

The terminal 20C has no configuration corresponding to the inclined portions 25A, 25B. That is, the second extending portion 22C of the terminal 20C is composed of the wire connecting portion 23 and a straight portion 24C. Therefore, the first extending portion 21C and the straight portion 24C are directly coupled in the terminal 20C.

From the above, the plurality of first extending portions 21A, 21B and 21C are parallel to each other in the plane direction. Further, the plurality of second extending portions 22A, 22B and 22C are parallel to each other in the plane direction. That is, the respective first extending portions 21A, 21B and 21C and the respective second extending portions 22A, 22B and 22C are located on the same plane.

(Configuration of Third Extending Portions 26)

The third extending portion 26 extends in the third direction Y from a part of the first extending portion 21A on the side of the case 101. In other words, the third extending portion 26 extends orthogonally to the first extending portion 21A in the plate thickness direction from a part of the first extending portion 21A on a side opposite to the second extending portion 22A. A plate thickness direction of the third extending portion 26 coincides with the first direction Z.

Plate thickness directions of the plurality of third extending portions 26 coincide with each other. The plurality of third extending portions 26 are parallel to each other in the second direction X.

Figure 5:
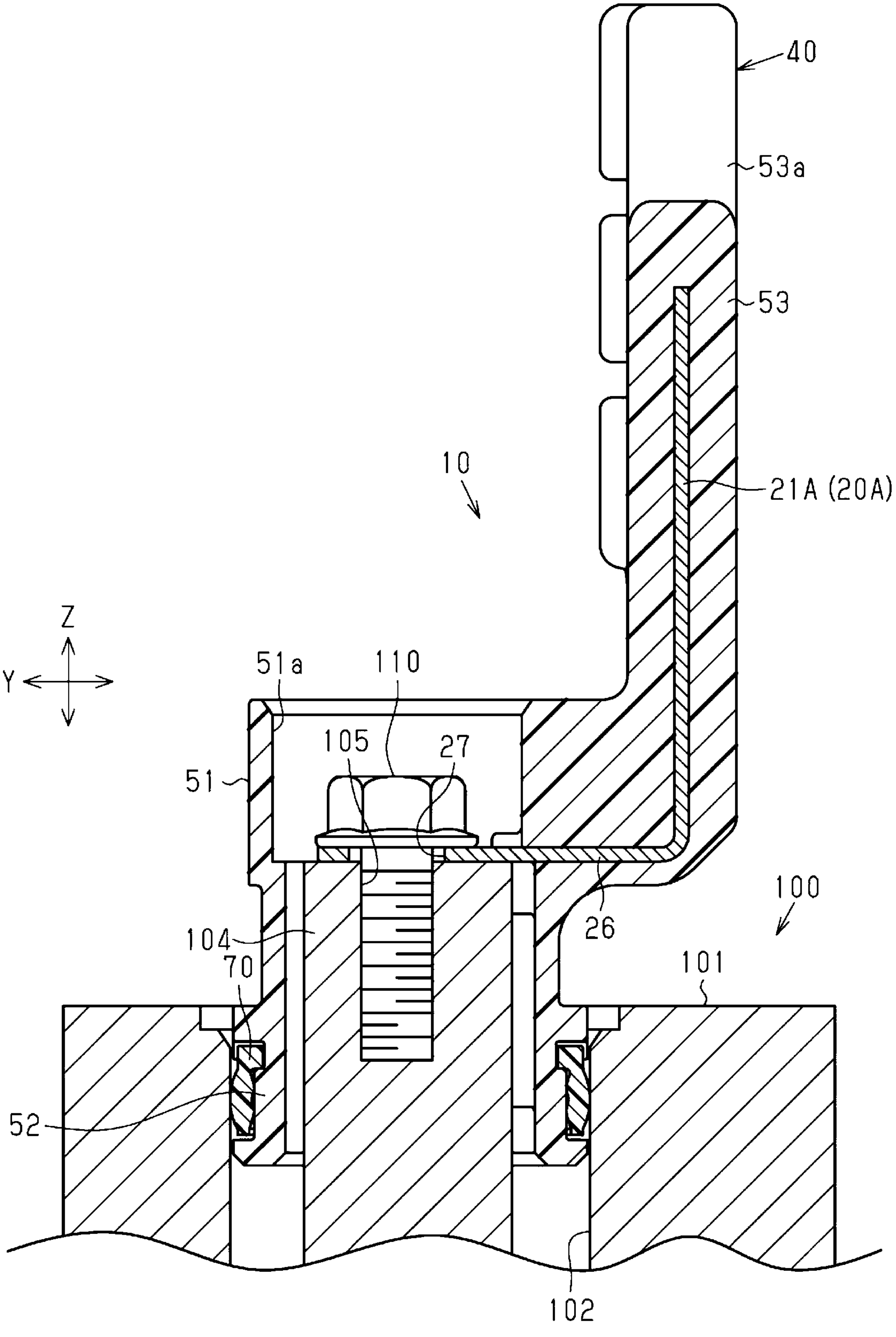
FIG. 5 is a section along 5-5 of FIG. 2.

The third extending portion 26 includes a bolt hole 27 penetrating therethrough in the first direction Z. As shown in FIG. 5, a bolt 110 inserted through the bolt hole 27 is fastened to the screw hole 105 of the connecting member 104, whereby the terminal 20 is electrically connected to the connecting member 104.

(Configuration of Housing 40)

As shown in FIG. 2, the housing 40 includes a body portion 50 for collectively covering the plurality of terminals 20 and a plurality of projecting portions 60 projecting from the body portion 50 in the second direction X to individually cover the plurality of wires 30. The housing 40 includes, for example, three projecting portions 60. The three projecting portions 60 are provided at intervals from each other in the arrangement direction of the plurality of wires 30, i.e. in the first direction Z.

The housing 40 is formed of an insulating resin material. A resin material such as polybutylene terephthalate (PBT) can be, for example, used as a material of the housing 40.

(Configuration of Body Portion 50)

As shown in FIGS. 2 and 3, the body portion 50 includes a tubular portion 51 penetrating in the first direction Z and a holding portion 53 extending in the first direction Z from the outer periphery of the tubular portion 51.

The tubular portion 51 accommodates the respective third extending portions 26. The tubular portion 51 includes an opening 51*a* where each bolt hole 27 is exposed. The opening 51*a* penetrates through the tubular portion 51 in the first direction Z. The opening 51*a* has an elliptical shape long in the second direction X.

As shown in FIG. 5, an inserting portion 52 to be inserted into the opening 102 of the case 101 is provided on one end part of the tubular portion 51 in the first direction Z. An annular sealing member 70 is provided on the outer peripheral surface of the inserting portion 52. Sealing is provided between the inserting portion 52 and the case 101 by the sealing member 70.

Although not shown, a service cover for closing the opening 51*a* is mounted on the other end of the tubular portion 51 opposite to one end in the first direction Z.

As shown in FIGS. 2 and 5, the holding portion 53 extends from the outer periphery of the other end of the tubular portion 51 toward a side opposite to the case 101 in the first direction Z. The holding portion 53 collectively covers the plurality of first extending portions 21A, 21B and 21C and the plurality of second extending portions 22A, 22B and 22C.

The holding portion 53 has an outer surface 53*a* extending along the inclined portion 25A of the terminal 20A and covering the inclined portion 25A. The outer surface 53*a* extends in the plane direction orthogonal to the extending direction of the inclined portion 25A.

(Configuration of Projecting Portions 60)

As shown in FIG. 2, each projecting portion 60 includes a first part 61 in which the insulation coating 32 and the exposed portion 31*a* of the wire 30 are embedded and a second part 62 in which the wire connecting portion 23 is embedded. The wire 30 extends in the second direction X from the first part 61. The second part 62 projects from an end part in the second direction X of the holding portion 53. Each first part 61 projects from an end part in the second direction X of the second part 62.

Figure 6:
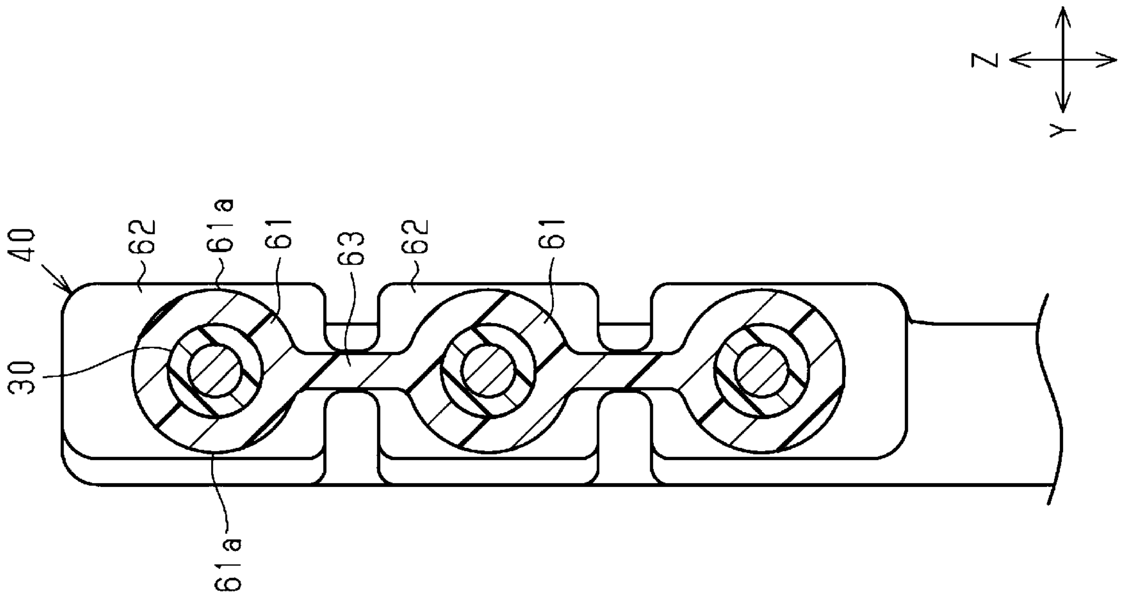
FIG. 6 is a section along 6-6 of FIG. 2.

As shown in FIG. 6, the first part 61 has, for example, a circular outer cross-sectional shape orthogonal to the second direction X. The second part 62 has, for example, a rectangular outer cross-sectional shape orthogonal to the second direction X. A thickness in the first direction Z of the second part 62 is larger than that in the first direction Z of the first part 61. A thickness in the third direction Y of the second part 62 is slightly larger than that in the first direction Z of the first part 61.

(Configurations of First Coupling Portions 63 and Second Coupling Portions 64)

As shown in FIG. 2, the housing 40 includes a plurality of first coupling portions 63 each coupling two first parts 61 adjacent to each other in the first direction Z and a plurality of second coupling portions 64 each coupling two second parts 62 adjacent to each other in the first direction Z. The housing 40 includes, for example, two first coupling portions 63 and two second coupling portions 64.

The two first parts 61 adjacent to each other in the first direction Z are merely referred to as "two first parts 61" and the two second parts 62 adjacent to each other in the first direction Z are merely referred to as "two second parts 62" below.

The first coupling portion 63 is provided at a position away from the second part 62 in the second direction X. More particularly, the first coupling portion 63 is provided at a position closer to a tip 60*c* than an intermediate part 60*b* between a base end 60*a* and the tip 60*c* of the projecting portion 60 in a projecting direction of the projecting portion 60, i.e. in the second direction X. Therefore, the first coupling portion 63 partially couples the two first parts 61. Note that the base end 60*a* is constituted by the second part 62. The intermediate part 60*b* and the tip 60*c* are constituted by the first part 61.

The insulation coating 32 of the wire 30 is embedded in a part of the projecting portion 60 closer to the tip 60*c* than the intermediate part 60*b*. Therefore, the first coupling portion 63 couples parts having the insulation coatings 32 embedded therein in the two first parts 61.

As shown in FIG. 6, the first coupling portion 63 is located inwardly of both outer surfaces 61*a* in the third direction Y of each first part 61. Therefore, a thickness in the third direction Y of the first coupling portion 63 is smaller than that in the third direction Y of the first part 61.

As shown in FIG. 2, the second coupling portion 64 is provided at a position away from the holding portion 53 in the second direction X. Accordingly, the second coupling portion 64 partially couples the two second parts 62. The second coupling portion 64 is provided between the holding portion 53 and the first coupling portion 63 in the second direction X. The second coupling portion 64 couples parts having the wire connecting portions 23 embedded therein in the two second parts 62.

Figure 7:
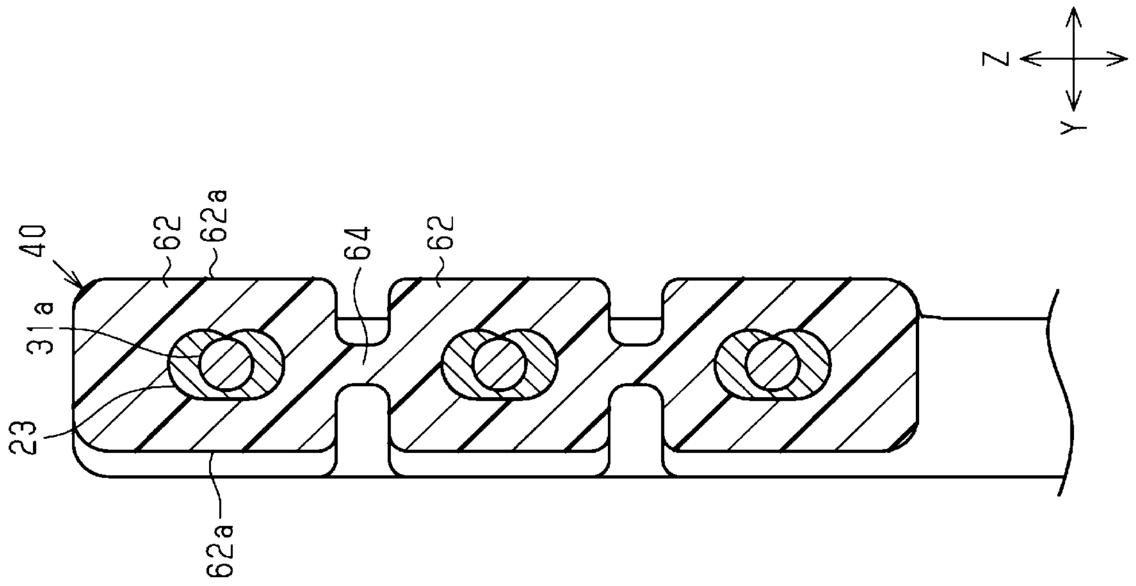
FIG. 7 is a section along 7-7 of FIG. 2.

As shown in FIG. 7, the second coupling portion 64 is located inwardly of both outer surfaces 62*a* in the third direction Y of each second part 62. Therefore, a thickness in the third direction Y of the second coupling portion 64 is smaller than that in the third direction Y of the second part 62.

(Configuration of Shield Shell 80)

Figure 8:
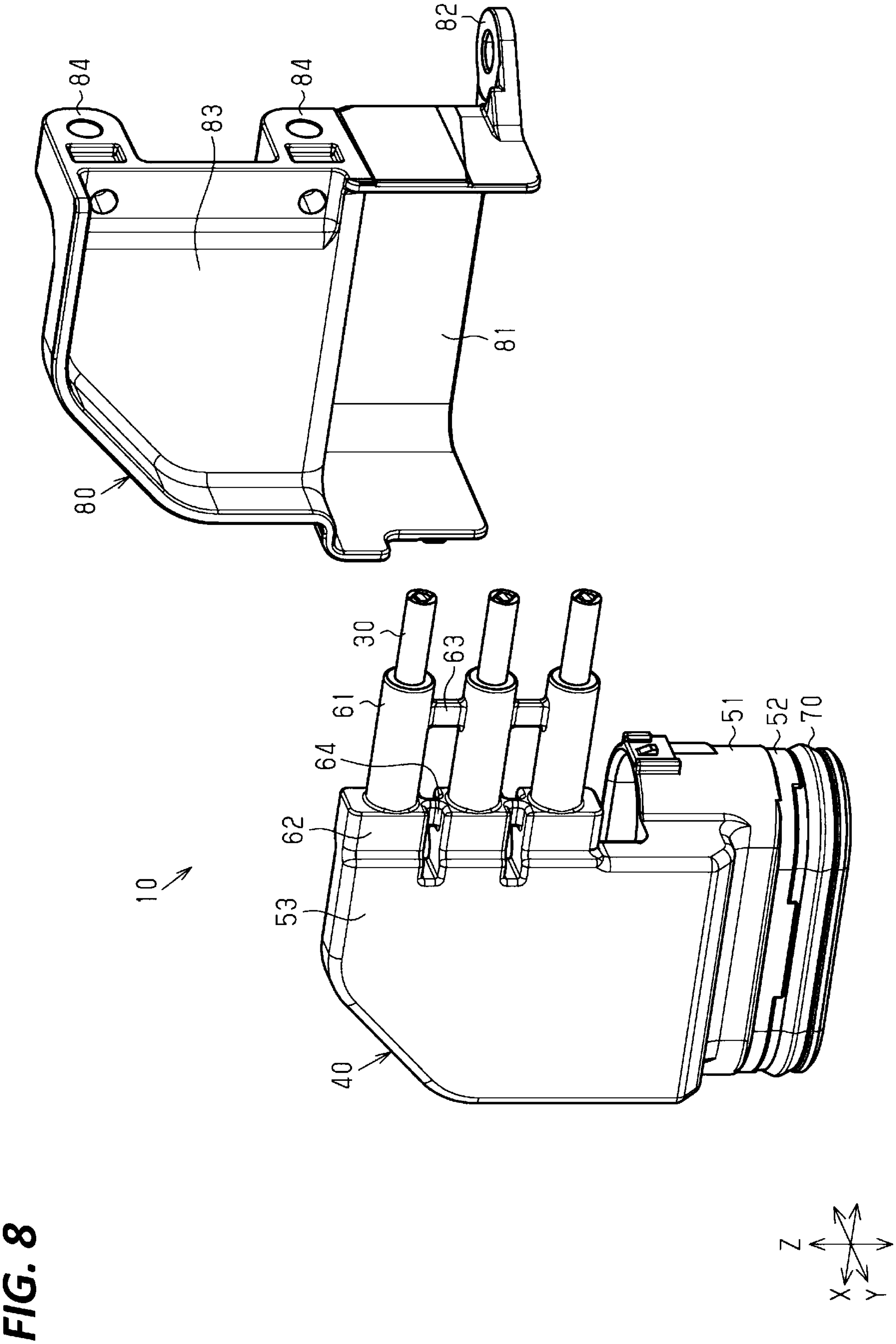
FIG. 8 is an exploded perspective view showing the housing and a shield shell in a separated state.

As shown in FIGS. 1 and 8, the shield shell 80 covers the housing 40 from one side in the third direction Y. The shield shell 80 includes a first shield portion 81 for covering the tubular portion 51 except the inserting portion 52 and a second shield portion 83 for covering the holding portion 53 and the respective second parts 62. The first and second shield portions 81, 83 are integrally formed.

An iron-based or aluminum based metal material can be, for example, used as a material of the shield shell 80.

As shown in FIG. 1, fixing portions 82 to be fixed to the case 101 are provided to project on both side parts in the second direction X of the first shield portion 81. The fixing portion 82 is provided with a through hole 82*a* penetrating in the first direction Z. The shield shell 80 is fixed to the case 101 by fastening a bolt 120 inserted into each through hole 82*a* to the fixing hole 103 of the case 101.

The second shield portion 83 has an outer surface 83*a* extending along the outer surface 53*a* of the housing 40. Two mounting portions 84 formed with internal threads are provided on one end in the second direction X of the second shield portion 83.

Although not shown, a tubular bracket made of metal for collectively covering the plurality of first parts 61 is mounted on the mounting portions 84. Note that a braided member formed by braiding metal strands is attached to this bracket.

A function of this embodiment is described.

The second extending portion 22A, 22B, 22C of each terminal 20 extends in the plane direction intersecting the first direction Z and orthogonal to the plate thickness direction of the first extending portion 21A, 21B, 21C. Thus, an extending direction of the wire 30 connected to each second extending portion 22A, 22B, 22C can be made different from the first direction Z, which is the mounting direction of the connector 10, without bending the wire 30.

Effects of this embodiment are described.

(1) The connector 10 includes the plurality of terminals 20 formed by the metal plate and extending in parallel to each other and the housing 40 made of resin for covering the plurality of terminals 20, and is mounted on the case 101 of the device 100. Each of the terminals 20A, 20B and 20C includes the first extending portion 21A, 21B, 21C extending in the first direction Z and the second extending portion 22A, 22B, 22C extending from the part of the first extending portion 21A, 21B, 21C on the side opposite to the case 101 and to be connected to the wire 30. The plate thickness directions of the plurality of first extending portions 21A, 21B and 21C coincide with each other. The plurality of second extending portions 22A, 22B, 22C extend in the plane direction orthogonal to the first direction Z and orthogonal to the plate thickness directions.

According to this configuration, the aforementioned function is achieved. Thus, even if another component different from the connector 10 is present on a side opposite to the case 101 across the connector 10, the interference of the wires 30 with the other component can be suppressed.

(2) The plurality of terminals 20 are embedded in the housing 40 while being separated from each other.

According to this configuration, since the housing 40 made of insulating resin is present between the terminals 20, the terminals 20 can be electrically insulated from each other.

(3) The plurality of first extending portions 21A, 21B and 21C are parallel to each other in the plane direction, and the plurality of second extending portions 22A, 22B and 22C are parallel to each other in the plane direction.

According to this configuration, the respective first extending portions 21A, 21B and 21C and the respective second extending portions 22A, 22B and 22C are located on the same plane. Thus, it is possible to suppress an increase in the size of the housing 40 and, consequently, an increase in the size of the connector 10 in the direction orthogonal to the plane direction, i.e. in the plate thickness directions of the first extending portions 21A, 21B and 21C.

(4) The second extending portion 22A farthest from the case 10 in the first direction Z, out of the plurality of second extending portions 22A, 22B and 22C, includes the inclined portion 25A continuous with the first extending portion 21A and extending obliquely with respect to the first direction Z. The housing 40 has the outer surface 53*a* extending along the inclined portion 25A and covering the inclined portion 25A.

According to this configuration, the plurality of terminals 20 can be made compact as compared to the case where the second extending portion 22A does not include the inclined portion 25A. Further, since the housing 40 has the outer surface 53*a* extending along the inclined portion 25A and covering the inclined portion 25A, the housing 40 can also be made compact. Therefore, an increase in the size of the connector 10 can be suppressed.

(5) Each second extending portion 22A, 22B, 22C includes the wire connecting portion 23 to be connected to the wire 30 and the straight portion 24A, 24B, 24C continuous with the wire connecting portion 23. The plurality of wire connecting portions 23 are parallel to each other in the direction orthogonal to the extending directions of the straight portions 24A, 24B and 24C.

According to this configuration, since the plurality of wire connecting portions 23 are parallel in the direction orthogonal to the extending directions of the straight portions 24A, 24B and 24C, lengths of the wires 30 connected to the respective wire connecting portions 23 can be easily made equal. Therefore, an increase in the types of the wires 30 used in the connector 10 can be suppressed.

(6) The connector 10 includes the plurality of wires 30 to be connected to the respective terminals 20. Each wire connecting portion 23 is embedded in the housing 40. Each wire 30 extends in the extending direction of the straight portion 24A, 24B, 24C.

According to this configuration, each wire connecting portion 23 is embedded in the housing 40. Thus, each wire connecting portion 23 can be protected by the housing 40. Further, each wire 30 extends in the extending direction of the straight portion 24A, 24B, 24C from the housing 40. Thus, a load is less likely to be applied to each wire connecting portion 23. Therefore, the durability of the connector 10 can be enhanced.

(7) The connector 10 includes the shield shell 80 made of metal for covering the outer periphery of a part of the housing 40 for covering the plurality of terminals 20.

According to this configuration, each terminal 20 embedded in the housing 40 can be electromagnetically shielded.

(8) The terminal 20A, 20B, 20C includes the third extending portion 26 extending in the plate thickness direction from the part of the first extending portion 21A, 21B, 21C on the side of the case 101. The third extending portion 26 includes the bolt hole 27 penetrating therethrough in the first direction Z. The housing 40 includes the tubular portion 51 penetrating therethrough in the first direction Z and configured to accommodate each third extending portion 26. The tubular portion 51 includes the opening 51*a* where each bolt hole 27 is exposed.

According to this configuration, the bolt 110 can be easily inserted through the opening 51*a* into the bolt hole 27 of the third extending portion 26 accommodated in the tubular portion 51. In this way, the third extending portion 26 and the connecting member 104 provided inside the case 101 can be easily fastened by the bolt 110. Therefore, a connecting operation of the connector 10 and the device 100 can be easily performed.

(9) Each wire 30 includes the core 31 and the insulation coating 32 covering the outer periphery of the core 31, and the exposed portion 31*a* of the core 31 exposed from the end part of the insulation coating 32 is connected to each terminal 20. The insulation coating 32 and the exposed portion 31*a* in each wire 30 are embedded in the first part 61 of each projecting portion 60. The first coupling portion 63 couples the parts having the insulation coatings 32 embedded therein in the two first parts 61 adjacent to each other.

The connector with the housing 40 having the wires 30 embedded therein is provided with the applied portions in which the adhesive is applied to the cores 31 exposed from the insulation coatings 32 to block water between the wires 30 and the housing 40. If parts having the applied portions embedded therein, out of the two projecting portions 60 adjacent to each other, are coupled by a coupling portion, the adhesive may be peeled off from the cores since the respective projecting portions 60 thermally shrink to approach the coupling portion when the housing 40 is injection molded.

In this respect, since the first coupling portion 63 couples the parts having the insulation coatings 32 embedded therein in the two first parts 61 according to the above configuration, the aforementioned inconvenience is less likely to occur.

<Modifications>

This embodiment can be modified and carried out as follows. This embodiment and the following modifications can be carried out in combination without technically contradicting each other.

- Each third extending portion 26 may extend in the first direction Z in the plane direction. In this case, an axial direction of each bolt hole 27 is orthogonal to the plane direction. In such a connector, for example, each third extending portion 26 and each connecting member 104 are fastened by the bolt in the third direction Y.
- The connection of the third extending portion 26 and the connecting member 104 is not limited to bolt fastening. Besides, the third extending portion 26 and the connecting member 104 overlapping each other may be, for example, sandwiched by a leaf spring.
- The housing 40 may be covered by a braided member formed by braiding metal strands instead of the shield shell 80.
- For example, if a voltage applied to the connector 10 is low, the shield shell 80 can be omitted from the connector 10.
- Each wire connecting portion 23 may be exposed from the housing 40. In this case, various insulating treatments and water cutoff treatments may be applied to each wire connecting portion 23.
- The respective wire connecting portions 23 may be parallel to each other in a direction intersecting the first direction Z in the plane direction.
- The outer surface 53*a* of the housing 40 may not extend along the inclined portion 25A.
- The plurality of second extending portions 22A, 22B and 22C may not be parallel in the plane direction. The plurality of second extending portions 22A, 22B and 22C may be, for example, parallel in a direction intersecting the plane direction. Such a configuration can be realized, for example, by making lengths of the respective third extending portions 26 different.
- Although the respective terminals 20 and the respective wires 30 are embedded in the housing 40 in the connector 10 of this embodiment, the connector 10 may cover the respective terminals 20 and the respective wires 30, for example, by a housing including a plurality of divided bodies to be assembled with each other.
- Each straight portion 24A, 24B, 24C only has to extend obliquely to the first extending portion 21A, 21B, 21C in the plane direction and an angle between the straight portion 24A, 24B, 24C and the first extending portion 21A, 21B, 21C can be set, for example, to an arbitrary angle such as 100°. In this case, each projecting portion 60 may be inclined at the above arbitrary angle with respect to the first direction Z.
- The numbers of the terminals 20 and the wires 30 can be changed as appropriate according to the specifications of the connector 10.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector to be mounted on a case of a device, comprising:

a plurality of terminals formed by a metal plate, the plurality of terminals extending in parallel to each other; and a housing made of resin and configured to cover the plurality of terminals, wherein:

each terminal includes a first extending portion extending in a mounting direction of the connector on the case and a second extending portion extending from a part of the first extending portion on a side opposite to the case and to be connected to a wire, plate thickness directions of a plurality of the first extending portions coincide with each other, a plurality of the second extending portions extend in a plane direction intersecting the mounting direction and orthogonal to the plate thickness directions, and the housing includes a body portion collectively covering the plurality of terminals and a plurality of projecting portions projecting from the body portion in the plane direction to individually cover a plurality of wires to be respectively connected to the terminals.

2. The connector of claim 1, wherein the plurality of terminals are embedded in the housing while being separated from each other.

3. The connector of claim 1, wherein:

the plurality of first extending portions are parallel to each other in the plane direction, and the plurality of second extending portions are parallel to each other in the plane direction.

4. The connector of claim 3, wherein:

the second extending portion farthest from the case in the mounting direction, out of the plurality of second extending portions, includes an inclined portion continuous with the first extending portion and extending obliquely with respect to the mounting direction, and the housing has an outer surface extending along the inclined portion and covering the inclined portion.

5. The connector of claim 3, wherein:

each second extending portion includes a wire connecting portion to be connected to the wire and a straight portion continuous with the wire connecting portion, and a plurality of the wire connecting portions are parallel to each other in a direction orthogonal to extending directions of the straight portions.

6. The connector of claim 1, wherein:

each second extending portion includes a wire connecting portion to be connected to the wire and a straight portion continuous with the wire connecting portion, each wire connecting portion is covered by the housing, and each wire extends in the extending direction of the straight portion.

7. The connector of claim 1, comprising a shield shell made of metal and configured to cover an outer periphery of a part of the housing that covers the plurality of terminals.

8. The connector of claim 1, wherein:

each terminal includes a third extending portion extending in the plate thickness direction from a part of the first extending portion on the case side, each third extending portion includes a bolt hole penetrating therethrough in the mounting direction, the housing includes a tubular portion penetrating therethrough in the mounting direction and configured to accommodate each third extending portion, the tubular portion includes an opening where each bolt hole is exposed.

* * * * *